United States Patent
Brunner et al.

(10) Patent No.: US 12,222,079 B2
(45) Date of Patent: Feb. 11, 2025

(54) METHOD FOR CONTROLLING ADAPTIVE MOTOR VEHICLE HEADLIGHT

(71) Applicant: ZKW Group GmbH, Wieselburg (AT)

(72) Inventors: Michael Brunner, Pöggstall (AT); Peter Mayer, Neumarkt an der Ybbs (AT)

(73) Assignee: ZKW Group GmbH, Wieselburg (AT)

( * ) Notice: Subject to any disclaimer, the term of this patent is extended or adjusted under 35 U.S.C. 154(b) by 241 days.

(21) Appl. No.: 18/116,978

(22) Filed: Mar. 3, 2023

(65) Prior Publication Data
US 2023/0296221 A1 Sep. 21, 2023

(30) Foreign Application Priority Data
Mar. 16, 2022 (EP) .................................... 22162541

(51) Int. Cl.
| | |
|---|---|
| *F21S 41/663* | (2018.01) |
| *B60Q 1/14* | (2006.01) |
| *F21S 41/153* | (2018.01) |

(52) U.S. Cl.
CPC .......... *F21S 41/663* (2018.01); *B60Q 1/1423* (2013.01); *F21S 41/153* (2018.01); *B60Q 2300/05* (2013.01); *B60Q 2300/054* (2013.01)

(58) Field of Classification Search
CPC .... F21S 41/663; F21S 41/153; B60Q 1/1423; B60Q 2300/05; B60Q 2300/054
(Continued)

(56) References Cited

U.S. PATENT DOCUMENTS

| | | | | |
|---|---|---|---|---|
| 6,774,367 B2 * | 8/2004 | Stephan | ................ | G01S 7/4804 |
| | | | | 250/341.8 |
| 7,258,474 B2 * | 8/2007 | Valcamp | ................ | F21S 41/153 |
| | | | | 362/555 |

(Continued)

FOREIGN PATENT DOCUMENTS

| | | | | |
|---|---|---|---|---|
| DE | 102008062640 A1 | 7/2009 | | |
| EP | 1388461 A2 * | 2/2004 | ............. | B60Q 1/085 |

OTHER PUBLICATIONS

Jose et al., "Multiple-Target Tracking for Intelligent Headlights Control," 2012, vol. 13, Publisher: IEEE.*
(Continued)

*Primary Examiner* — Tuan C To
(74) *Attorney, Agent, or Firm* — Eversheds Sutherland (US) LLP

(57) ABSTRACT

A method for controlling an adaptive motor vehicle headlight (AMVH), wherein a first data storage device (DSD) is assigned to the AMVH, which is designed to emit different segmented light distributions having a resolution of at least 2×12 and has light sources arranged in segments for this purpose, each segment including at least one LED light source. The method includes: a) providing the AMVH and the first DSD and storing a number of data sets on the first DSD, b) connecting the AMVH to a motor vehicle, which is designed to output control data for controlling the AMVH, c) transmitting the control data by the motor vehicle to the AMVH, wherein the AMVH has an internal computing unit, which receives the control data and selects and retrieves data sets stored in the first DSD as a function of the control data ("active data sets"), d) controlling the light sources arranged in the segments by the computing unit in accordance with the active data sets, d1) determining the number of active data sets, wherein the control data is used to give each active data set an individual percentage weighting, d2) determining (Continued)

target light intensities to be output of each segment by superimposing the light intensity values that can be derived from the active data sets taking the respective weighting into account, d3) outputting the target light intensities for each segment taking into account a permissible maximum temporal rate of change of the light intensity that can be predetermined.

14 Claims, 4 Drawing Sheets

(58) Field of Classification Search
USPC .......................................................... 701/36
See application file for complete search history.

(56) References Cited

U.S. PATENT DOCUMENTS

| | | | |
|---|---|---|---|
| 7,840,326 B1 * | 11/2010 | Yamada | G01C 21/30 |
| | | | 701/472 |
| 8,974,099 B2 * | 3/2015 | Morgenstern | B60Q 1/1415 |
| | | | 362/543 |
| 9,126,529 B2 * | 9/2015 | Nordbruch | B60Q 1/085 |
| 10,752,162 B2 * | 8/2020 | Gutjahr | F21S 41/141 |
| 10,913,387 B2 * | 2/2021 | Pellarin | F21S 41/663 |
| 11,242,973 B2 * | 2/2022 | Roels | F21S 41/143 |
| 11,293,618 B2 * | 4/2022 | Huester | B60Q 1/143 |
| 2008/0084165 A1 * | 4/2008 | Otsuka | H04N 7/183 |
| | | | 315/82 |
| 2008/0239746 A1 | 10/2008 | Wuller et al. | |
| 2008/0316759 A1 * | 12/2008 | Valcamp | B60Q 1/12 |
| | | | 362/545 |
| 2024/0003511 A1 * | 1/2024 | Taleb | F21S 41/663 |

OTHER PUBLICATIONS

Search Report for European Patent Application No. 22162541.1, dated Aug. 18, 2022 (8 pages).

* cited by examiner

ND DESCRIPTION OF PRIOR ART

METHOD FOR CONTROLLING ADAPTIVE MOTOR VEHICLE HEADLIGHT

CROSS-REFERENCE TO RELATED APPLICATIONS

This application claims priority to European Patent Application No. 22162541.1, filed Mar. 16, 2022, which is incorporated herein by reference.

FIELD OF THE INVENTION AND DESCRIPTION OF PRIOR ART

The invention relates to a method for controlling an adaptive motor vehicle headlight, wherein a first data storage device is assigned to the adaptive motor vehicle headlight, wherein the adaptive motor vehicle headlight is designed to emit different segmented light distributions having a resolution of at least 2×12 and has light sources arranged in segments for this purpose, wherein each segment comprises at least one LED light source.

The invention further relates to a motor vehicle headlight, which is prepared for use of a method according to the invention.

Headlights that enable an adaptive light distribution to be emitted have become known from the prior art. Such headlights are sometimes also referred to as pixel modules among experts. The light segments or pixels (hereinafter also referred to as "segments" for short) can be individually switched and dimmed, and an intensity value is assigned to each light segment.

There are a wide variety of ways of producing such adaptive light distribution consisting of several light segments (pixels). The use of a plurality of LEDs arranged in a matrix is a known and efficient method, wherein each individual LED can be individually switched and dimmed and thus forms a pixel or light segment in emitted light distribution.

This type of light system thus enables the formation of largely arbitrary light images, wherein, for example, basic light distribution can be adapted at any time in order, for example, to hide or illuminate other road users (such as pedestrians or vehicles) in a targeted manner. Switching between different light functions can be achieved by retrieving corresponding data sets from a storage device and then transmitting the data to a light unit responsible for the light emission. Different vehicle manufacturers often have different requirements in terms of the number, type and switching between various light functions. Often, a smooth transition is to be achieved when switching light function or light distribution. In some cases, legal requirements must also be fulfilled, especially if the light image is to be adapted when driving around bends. When driving around bends, the focus of the light image can be shifted to a lesser or greater extent depending on the steering angle in order to better illuminate the road. Sudden changes in the light image should therefore only be reserved for exceptional situations as these have an unpleasant effect and can unwantedly restrict or divert a driver's attention. One solution known from the prior art for avoiding a sudden change in the light image due to switching between several light distributions arises from calculating the individual intensity values of all individual pixels taking limit values into account; this solution, however, places great demands on the computing power of the computing unit, in particular as the number of pixels increases.

SUMMARY OF THE INVENTION

It is therefore an object of the invention to provide a method for controlling an adaptive motor vehicle headlight, which can overcome the drawbacks mentioned in the introduction. This object is achieved with a method of the type mentioned in the introduction, in which the following steps are provided according to the invention:

a) providing an aforementioned adaptive motor vehicle headlight and an aforementioned first data storage device as well as storing a number of data sets on the first data storage device, wherein each data set specifies a light intensity value for each segment for implementing light distribution to be emitted by the adaptive motor vehicle headlight, wherein the number of data sets comprises at least two groups of data sets, namely a first group of dipped beam data sets and a second group of full beam data sets, wherein each group comprises at least one data set, wherein each dipped beam data set is configured to produce dipped beam distribution and each full beam data set is configured to produce full beam distribution, wherein the configurations of the respective light distributions are different for different data sets, b) connecting the adaptive motor vehicle headlight to a motor vehicle, wherein the motor vehicle is designed to output control data for controlling the adaptive motor vehicle headlight, c) transmission of the control data by the motor vehicle to the adaptive motor vehicle headlight, wherein the adaptive motor vehicle headlight has an internal computing unit, which receives the control data and selects and retrieves data sets stored in the first data storage device as a function of the control data, hereinafter also referred to as active data sets, d) control of the light sources arranged in the segments by the computing unit in accordance with the active data sets according to step c) using a configurable smoothing function, wherein the adaptive motor vehicle headlight has an internal data storage device, on which a light distribution transition control algorithm is stored, wherein the light distribution transition control algorithm can be specified by an interface, by means of which the internal data storage device can be externally accessed, and the configurable smoothing function is set by the light distribution transition control algorithm, wherein the configurable smoothing function is used in any case in compliance with the following rules:

d1) determining the number of active data sets, wherein the control data is used to give each active data set an individual percentage weighting, d2) determining the target light intensities to be output of each segment by superimposing the light intensity values that can be derived from the active data sets taking the respective weighting into account, d3) output of the target light intensities for each segment taking into account a permissible maximum temporal rate of change of the light intensity that can be predetermined, which is emitted by the respective segment, wherein if a permissible maximum temporal rate of change that can be predetermined by the configurable smoothing function is exceeded, the target light intensities are temporarily manipulated such that the permissible maximum temporal rate of change is not exceeded.

The minimum number of segments is 24, and comprises a matrix consisting of 2 rows and 12 columns. Currently, resolutions of up to 200 pixels can be economically produced with this technology using LEDs, although the use of a higher number of pixels would also be conceivable in principle. However, an increasing number of pixels also entails increased computational effort to calculate the individual target light intensities, which is why the maximum number of pixels that can be economically operated in the future without the use of a GPU can be specified, for example, as 400, wherein these segments are divided into a matrix with rows and columns. Alternatively, in the case of a particularly high number of pixels, groups of pixels could be grouped into jointly controlled clusters, which could reduce the computing power of the algorithm. The light intensity can be adjusted, for example, by timing the switch-on durations of the segments or the switch-on and switch-off duration time ratios (corresponding to a duty cycle).

The first data storage device can be arranged externally from the headlight. Alternatively, it can be arranged inside the headlight.

Control data are data transmitted by the vehicle to the headlight. On the one hand, it can be data that is actively specified by the user (e.g. if the user selects a light function themselves), which is generated depending on the user's behaviour (such as turning into a bend or a steering angle caused by this) or else data unrelated to the user's behaviour and, for example, generated by the vehicle or by an environment detection system arranged in the vehicle, which is designed to detect the vehicle environment.

As an alternative to the use with LED light sources, the invention could also be used with other headlights whose segmentation does not involve the control of LEDs. In this context, the technologies of digital micro-mirror device (DMD), laser scanner, liquid crystal display (LCD) or other spatial light modulator systems (SLM systems) should be mentioned.

The intensity values can be stored in a storage device and together describe a basic light distribution. Various basic light distributions, such as dipped beam, full beam, adverse weather light, city light, etc. can be stored on the storage device in the form of data sets as basic light distributions. It is of no significance to the invention whether each pixel is actually present on the storage device as a discrete value in the data set or, as is usual, is interpolated between the values of a number of spaced apart pixels.

In particular, it can be provided that the total of the individual percentage weightings in each group does not exceed the value 100%, and wherein each group is in turn given a group weight value, and the total of the group weight values does not exceed the value 100%, wherein the target light intensities of each segment are determined in accordance with step d2) by virtue of the individual percentage weightings being multiplied by the respective group weight value of the associated group and the resulting weight values are calculated, wherein the light intensity values that can be derived from the active data sets are multiplied by the respective resulting weight value and the resulting light intensity values for each segment of each active data set are added up and this total is determined as the target light intensity for each segment.

It can further be provided that all weight values are selected such that the total of the resulting weight values reaches the value 100%. Alternatively, it is also conceivable that generally a lower-performance operation, i.e. an operation with a resulting weighting of less than 100% in total, can be maintained.

In particular, it can be provided that the first group of dipped beam data sets comprises data sets to produce the following different dipped beam distributions:

I) a first dipped beam distribution, which can be used as a standard dipped beam distribution, wherein this is preferably a glare-free dipped beam, II) a second dipped beam distribution, which has an increased range in a right half of the light distribution compared to the first dipped beam distribution to allow an increased range at a right-hand lane edge for improved pedestrian detection, III) a third dipped beam distribution, which is wider than the first dipped beam distribution and has a horizontal cut-off line, IV) a fourth dipped beam distribution, which has an increased range compared to the first beam distribution by virtue of the fact that the dipped beam distribution is moved vertically upwards by an angle of at least 1° compared to the first dipped beam distribution.

In terms of I, it should be mentioned that glare is deemed to have been eliminated or a glare-free dipped beam can be spoken of if the illuminance of the dipped beam at a distance of 25 m in front of each individual headlight on a plane perpendicular to the road at the level of the centre of the headlights and above does not exceed 1 lx. If the highest point of the illuminating surface of the headlights is more than 1200 mm above the road surface, the illuminance under the same conditions shall not exceed 1 lx above a height of 1000 mm. For headlights whose mounting height exceeds 1400 mm, the cut-off line 15 m in front of the headlight shall be only half the height of the centre of the headlight. In the case of headlights for asymmetrical dipped beam, the 1 lux limit may rise from the point corresponding to the centre of the headlight at an angle of 15 degrees to the right, unless stated otherwise, for example, for legal reasons. The headlights can illuminate the road such that the illuminance at a distance of 25 m in front of the headlights perpendicular to the incident light at 150 mm height above the road reaches at least the intended values. Headlights used in pairs for full beam and dipped beam can be designed so that they can only be dimmed simultaneously and equally.

In terms of II, it should be mentioned that a larger beam distance and, potentially, a higher light intensity is provided compared to the light distribution according to point I. This means that a light distribution can be provided, which has dipped beam distribution with a higher range at the right-hand lane edge (from the driver's perspective) in order to identify pedestrians early on. For this purpose, a higher light intensity can, for example, be provided in individual segments, or segments that are inactive in the light distribution according to point I can also be actively switched on.

In terms of III, it should be mentioned that, for example, the cut-off line can be horizontal to offer even better anti-glare protection for other road users and to illuminate in particular the area in front of the vehicle more widely.

In terms of IV, it should be mentioned that such a light distribution can, for example, be provided by raising the beam of light produced by the motor vehicle headlight, wherein this can occur, for example, at increased speeds (e.g. over 80 km/h).

It can further be provided that the second group of full beam data sets comprises data sets to produce the following different full beam distributions:

I) a first full beam distribution, which can be used as a standard full beam distribution, II) a second full beam distribution, which has a reduced light intensity compared to the first full beam distribution but operates such that it continues to meet at least the minimum legal requirements, III) a third full beam distribution, which increases the light intensity or range at high vehicle speeds (e.g. over 80 km/h) compared to the first full beam distribution, for example by raising the beam of light produced by the motor vehicle headlight.

In terms of I, it should be mentioned that this light distribution enables increased visibility when driving in the dark. Visibility relates to the maximum horizontal distance at which an object close to the ground can be detected through appropriate illumination provided by the headlights of the vehicle when driving in the dark.

In terms of II, it should be mentioned that this can be an eco full beam.

In practice, all light distributions are, of course, designed by the specialist such that they can meet the applicable legal requirements.

In particular, it can be provided that the number of data sets comprises a third group of data sets, which concern special light distributions, which neither correspond to dipped beam distribution nor full beam distribution. These can, for example, be special light functions, which are neither a dipped beam function nor a full beam function. These special functions can also be designed with the relevant country or weather in mind.

It can further be provided that the maximum temporal rate of change of the target light intensities is varied within a predetermined upper and lower limit as a function of the detected control data, wherein the actual rate of change is selected in any case such that a change of the target light intensity of 0% up to 100% takes place within a time period of between 0.1 seconds and 5 seconds.

In practice, a value of 1 second has proven favourable for the change from 0 to 100%, for example. The change may be linear or non-linear. The permissible maximum temporal rates of change that can be predetermined by the configurable smoothing function temporarily manipulate the target light intensities such that the permissible maximum temporal rate of change is not exceeded. The term maximum temporal rate of change is understood to mean a rate of change of the emitted intensity of a segment. For example, if a segment emits a luminous flux of 200 lm at full operation (i.e. 100% usage), a change from 0 to 100% performance would require a time of 1 second with a permissible maximum rate of change of 200 lm/second provided that the permissible maximum rate of change is precisely observed. The actual rate of change can, of course, be lower-especially if a more rapid change is not required anyway due to the respective change of a light function or the change of a weighting. This maximum rate of change can also be considerably higher and, for example, permit a change from 0 to 100% light output within 0.1 seconds. The respectively applicable maximum rate of change can be determined depending on a driving situation.

In particular, it can be provided that the maximum temporal rate of change is increased compared to normal operation if a critical traffic situation is detected. This permissible maximum rate of change can also be dependent on control data. It can thus be provided that the maximum permissible rate of change is increased in a traffic-critical situation and is reduced in a normal traffic situation in order not to divert the driver's attention. Smoothing can occur individually for each segment, i.e. one segment, for example, smoothed, and another not if no maximum rate of change is exceeded there.

It can further be provided that the motor vehicle headlight is designed to check the plausibility of the control data and to perform this check continuously, wherein if corrupted control data is detected, a reversion to safe operation occurs in which preferably the first dipped beam distribution is emitted.

In particular, it can be provided that the control data contains information on other road users detected in the vicinity of the vehicle, and in the event that the active data sets contain full beam data sets, these full beam distributions are manipulated such that segments, the activation of which would dazzle these road users, are controlled with lower intensity, or are preferably completely hidden. This means that the vehicle headlight is preferably designed in such a way as to prevent dazzling other road users.

It can further be provided that, to produce effects, the target light intensities for each segment can be temporarily manipulated after step d3) by replacing the target light intensities calculated according to step d3) with effect light intensities. This temporary manipulation is limited to the duration of the effect/animation (e.g. "welcome light") and is typically less than 5 seconds.

In particular, it can be provided that the target light intensities are manipulated according to step d3) as a function of the steering angle of the vehicle by moving the target light distribution calculated according to step d3) in the horizontal direction as a function of the steering angle of the vehicle. This can produce a cornering light by the light distribution being moved left, for example, when steering to the left. This means the target light intensities move in a horizontal direction between adjacent segments. This process can also be called "bending".

The invention further relates to an adaptive motor vehicle headlight, which is designed for use in a method according to the invention, wherein the adaptive motor vehicle headlight is designed to emit different segmented light distributions having a resolution of at least 2×12 and has light sources arranged in segments for this purpose, wherein each segment comprises at least one LED light source.

The invention further relates to a motor vehicle comprising an adaptive motor vehicle headlight according to the invention as well as a first data storage device, which is assigned to the adaptive motor vehicle headlight, wherein a number of data sets is stored on the first data storage device, wherein each data set specifies a light intensity value for each segment for implementing light distribution to be emitted by the adaptive motor vehicle headlight, wherein the number of data sets comprises at least two groups of data sets, namely a first group of dipped beam data sets and a second group of full beam data sets, wherein each group comprises at least one data set, wherein each dipped beam data set is configured to produce dipped beam distribution and each full beam data set is configured to produce full beam distribution, wherein the configurations of the respective light distributions are different for different data sets, wherein the motor vehicle is designed for environment detection as well as for transmitting control data to the motor vehicle headlight.

The expression environment detection describes detection of the vehicle environment, which can occur by means of sensors such as optical cameras, ultrasonic sensors, lidars, radars, etc.

BRIEF DESCRIPTION OF THE DRAWINGS

The invention is outlined in more detail below based on an exemplary and non-limiting embodiment, which is illustrated in the figures. In the figures

In the following figures, unless otherwise stated, the same reference numbers denote the same features.

DETAILED DESCRIPTION OF EMBODIMENTS OF THE INVENTION

Figure 1:
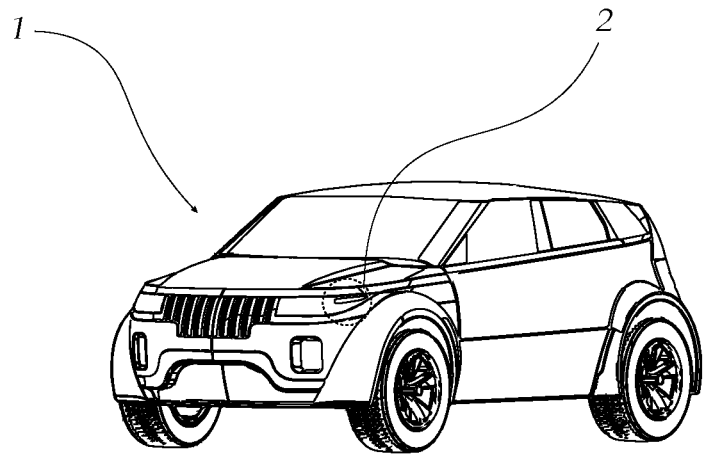
FIG. 1 shows a schematic illustration of a motor vehicle according to the invention with an adaptive motor vehicle headlight according to the invention.

FIG. 1 shows a schematic illustration of a motor vehicle 1 according to the invention with an adaptive motor vehicle headlight 2 according to the invention.

Figure 2:
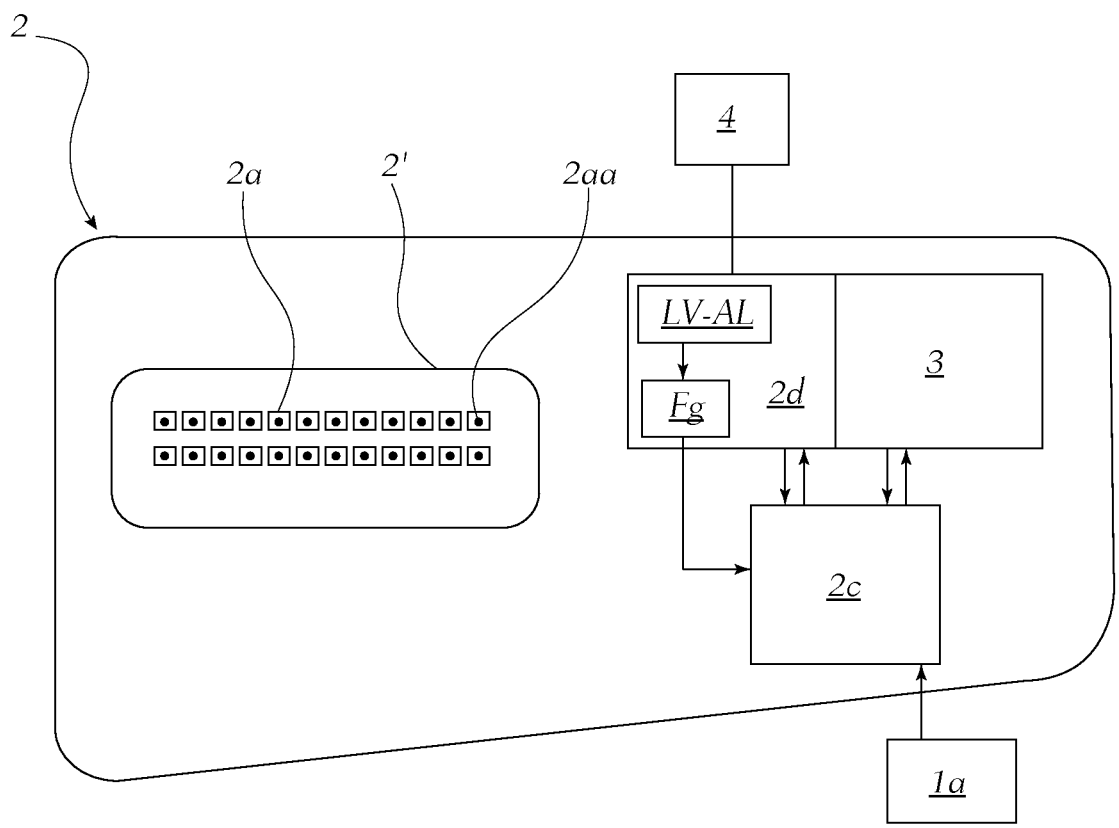
FIG. 2 shows an adaptive motor vehicle headlight according to the invention.

FIG. 2 shows an adaptive motor vehicle headlight 2 according to the invention. This motor vehicle headlight comprises a light module 2' to emit light distributions. The light module 2' in this example comprises a matrix of light sources 2aa in the form of 24 LEDs, which are arranged in two rows and twelve columns. A first data storage device 3 is assigned to the adaptive motor vehicle headlight 2. The adaptive motor vehicle headlight 2 is therefore designed to emit different segmented light distributions having a resolution of at least 2×12 and has light sources 2aa arranged in segments 2a for this purpose, wherein each segment 2aa comprises at least one LED light source, in this case exactly one LED light source. The adaptive motor vehicle headlight 2 has an internal computing unit 2c, which is designed to receive control data 1a. The control data 1a can contain information on other road users detected in the vicinity of the vehicle 1 or information about the motor vehicle. It can also be provided or influenced by the user or vehicle driver. In particular, it can be provided that the control data 1a contains information on other road users detected in the vicinity of the vehicle 1, and in the event that the active data sets contain full beam data sets 3b1 to 3b4, these full beam distributions LVb1 to LVb4 are manipulated such that segments 2a, the activation of which would dazzle these road users, are controlled with lower intensity, or are preferably completely hidden. This means that the vehicle headlight 2 is preferably designed in such a way as to prevent dazzling other road users. This function is called Glarefree-High-Beam-Mask (GFHB mask) in FIG. 4, wherein a weighted so-called glare-free high beam light distribution results therefrom, i.e. full distribution, which is designed to be glare-free taking control data 1a into account. Furthermore, a move-hor function can be provided, which moves the target light distribution in a horizontal direction depending on the steering angle of the vehicle 1. For the sake of completeness, it should be mentioned that both the move-_hor function and the GFHB mask function are optional and the method according to the invention can also be carried out without using these functions.

With regard to FIG. 2, it should also be mentioned that the adaptive motor vehicle headlight 2 has an internal data storage device 2d, on which a light distribution transition control algorithm LV-AL is stored, wherein the light distribution transition control algorithm LV-AL can be specified by an interface 4, by means of which the internal data storage device 2d can be externally accessed, and the configurable smoothing function Fg is set by the light distribution transition control algorithm LV-AL.

Figure 3:
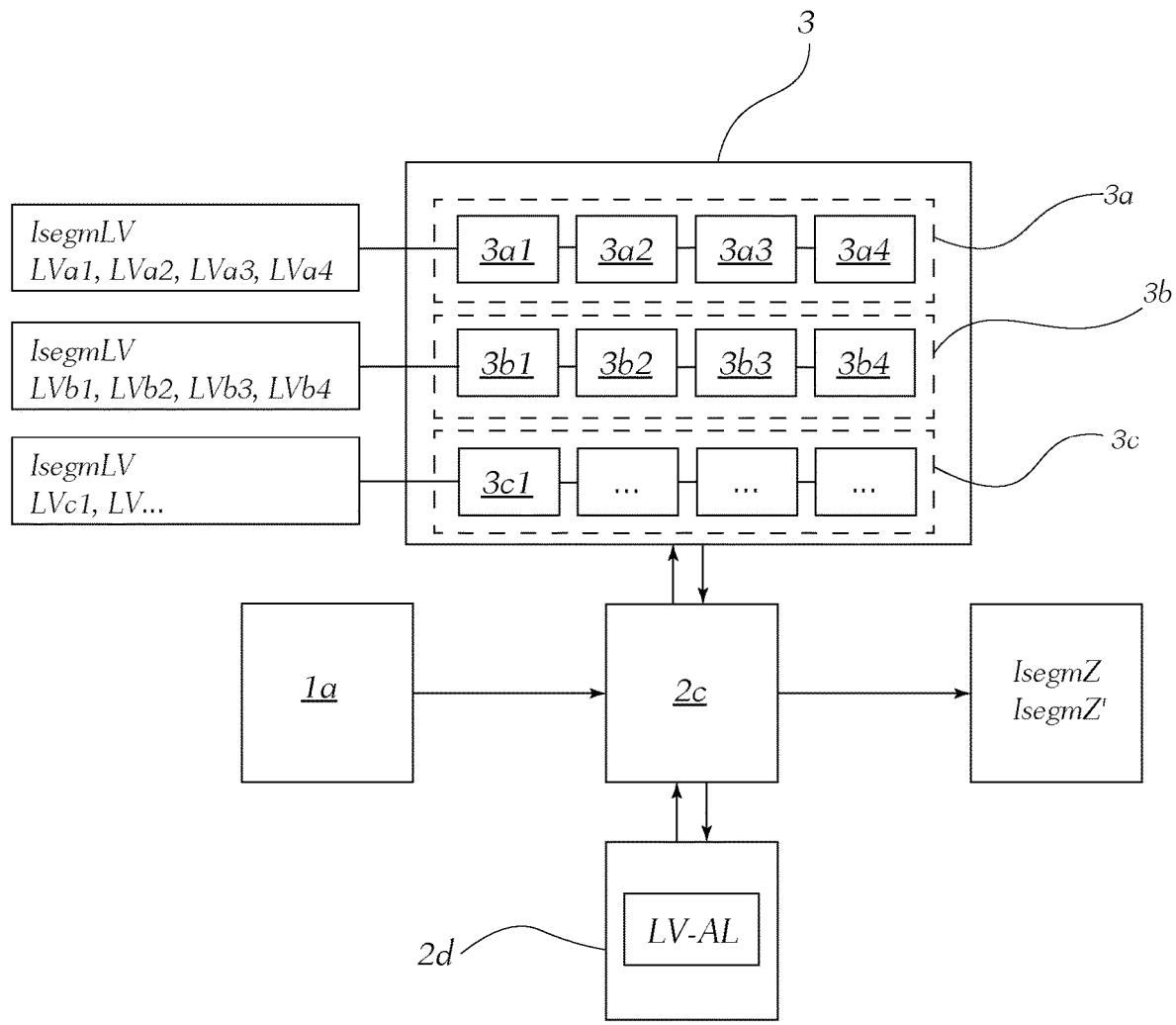
FIG. 3 shows an exemplary illustration of individual aspects of the invention.

FIG. 3 shows an exemplary illustration of individual aspects or individual components of the invention. The invention relates to a method for controlling the adaptive motor vehicle headlight 2, wherein the first data storage device 3 is assigned to the adaptive motor vehicle headlight 2, wherein the adaptive motor vehicle headlight 2 is designed to emit different segmented light distributions having a resolution of at least 2×12 and, as already mentioned, has light sources 2aa arranged in segments 2a for this purpose, wherein each segment 2aa comprises at least one LED light source, wherein the method has the following steps:

a) providing an aforementioned adaptive motor vehicle headlight 2 and an aforementioned first data storage device 3 as well as storing a number of data sets 3a1, 3a2, 3a3, 3a4, 3b1, 3b2, 3b3, 3b4 on the first data storage device 3, wherein each data set specifies a light intensity value IsegmLV for each segment 2a for implementing light distribution LVa1, LVa2, LVa3, LVat, LVb1, LVb2, Lvb3 to be emitted by the adaptive motor vehicle headlight 2, wherein the number of data sets comprises at least two groups 3a, 3b of data sets, namely a first group 3a of dipped beam data sets 3a1, 3a2, 3a3, 3a4 and a second group 3b of full beam data sets 3b1, 3b2, 3b3, 3b4, wherein each group 3a, 3b comprises at least one data set 3a1, 3a2, 3a3, 3a4, 3b1, 3b2, 3b3, 3b4, wherein each dipped beam data set 3a1, 3a2, 3a3, 3a4 is configured to produce dipped beam distribution and each full beam data set 3b1, 3b2, 3b3 is configured to produce full beam distribution, wherein the configurations of the respective light distributions are different for different data sets 3a1, 3a2, 3a3, 3a4, 3b1, 3b2, 3b3, 3b4, b) connecting the adaptive motor vehicle headlight 2 to a motor vehicle 1, wherein the motor vehicle 1 is designed to output control data 1a for controlling the adaptive motor vehicle headlight 2, c) transmission of the control data 1a by the motor vehicle 1 to the adaptive motor vehicle headlight 2, wherein the adaptive motor vehicle headlight 2 has an internal computing unit 2c, which receives the control data 1a and selects and retrieves data sets 3a1, 3a2, 3a3, 3a4, 3b1, 3b2, 3b3 stored in the first data storage device 3 as a function of the control data 1a, hereinafter also referred to as active data sets, d) control of the light sources 2aa arranged in the segments 2a by the computing unit 2c in accordance with the active data sets 3a1, 3a2, 3a3, 3a4, 3b1, 3b2, 3b3 according to step c) using a configurable smoothing function Fg, wherein the adaptive motor vehicle headlight 2 has an internal data storage device 2d, on which a light distribution transition control algorithm LV-AL is stored, wherein the light distribution transition control algorithm LV-AL can be specified by an interface 4, by means of which the internal data storage device 2d can be externally accessed, and the configurable smoothing function Fg is set by the light distribution transition control algorithm LV-AL, wherein the configurable smoothing function Fg is used in any case in compliance with the following rules (see FIG. 4):

d1) determining the number of active data sets 3a1, 3a2, 3a3, 3a4, 3b1, 3b2, 3b3, wherein the control data 1a is used to give each active data set 3a1, 3a2, 3a3, 3a4, 3b1, 3b2, 3b3 an individual percentage weighting wab1, wab2, wab3, wab4, wfern1, wfern2, d2) determining the target light intensities IsegmZ to be output of each segment 2a by superimposing the light intensity values IsegmLV that can be derived from the active data sets 3a1, 3a2, 3a3, 3b1, 3b2, 3b3 taking the respective weighting into account, d3) output of the target light intensities IsegmZ for each segment 2a taking into account a permissible maximum temporal rate of change of the light intensity that can be predetermined, which is emitted by the respective segment 2a, wherein if a permissible maximum temporal rate of change Var that can be predetermined by the configurable smoothing function Fg is exceeded, the target light intensities IsegmZ are temporarily manipulated such that the permissible maximum temporal rate of change Var_max is not exceeded. If necessary, the target light intensity IsegmZ therefore becomes a manipulated target light intensity IsegmZ', which is temporarily lower than the actual target light intensity IsegmZ' to the extent that the permissible maximum temporal rate of change Var_max is not exceeded for the duration until the non-manipulated target light intensity IsegmZ is reached.

In principle, the inactive data sets can also be recorded by the computing unit 2c; however, in order to reduce data, it may be expedient to only record the active data sets, i.e. those data sets whose weighting is not 0.

It can preferably be provided that the total of the individual percentage weightings wab1, wab2, wab3, wfern1, wfern2, wfern3 in each group 3a, 3b does not exceed the value 100%, and wherein each group 3a, 3b is in turn given a group weight value wab_ges, wfern_ges, and the total of the group weight values does not exceed the value 100%, wherein the target light intensities of each segment 2a are determined in accordance with step d2) by virtue of the individual percentage weightings wab1, wab2, wab3, wab4, wfern1, wfern2 being multiplied by the respective group weight value wab_ges, wfern_ges of the associated group and the resulting weight values wab1_res, wab2_res are calculated, wherein the light intensity values IsegmLV that can be derived from the active data sets are multiplied by the respective resulting weight value wab1_res, wab2_res and the resulting light intensity values for each segment 2a of each active data set 3a1, 3a2, 3a3, 3a4, 3b1, 3b2, 3b3, 3b4 are added up and this total is determined as the target light intensity for each segment 2a.

A brief example for an embodiment of the invention is given: Let us assume the group dipped beam distribution has a weighting of 60%, i.e. wab_ges=0.6, and the group full beam distribution has a weighting of 40%, i.e. wfern_ges=0.4. If, for example, the dipped beam distribution comprises two active light distributions that are to be equally weighted (i.e. wab1=0.5 and wab2=0.5), the resulting intensity of the respective dipped beam distributions wab1_res and wab2_res would be obtained by multiplying by the weighting wab_ges, i.e. at 0.5× 0.6=0.3=wab1_res=wab2_res total weighting each. The full beam distributions are weighted in the same way such that the resulting total weighting does not exceed the value 1. In this way, the individual light distributions can be superimposed elegantly and with little computational effort. The extent of the superimposition and the transition from one light function to the next can be easily adapted to the needs of the individual vehicle manufacturer by determining the smoothing function Fg without fundamental changes needing to be made to the light functions of the vehicle headlight.

In particular, it can be provided that all weight values are selected such that the total of the resulting weight values wab1_res, wab2_res reaches the value 100%. Alternatively, it is also conceivable that generally weaker operation, i.e. under 100%, can be maintained.

It can be provided that the first group 3a of dipped beam data sets 3a1, 3a2, 3a3, 3a4 comprises data sets to produce the following different dipped beam distributions LVa1, LVa2, LVa3, LVa4:

I a first dipped beam distribution LVa1, which can be used as a standard dipped beam distribution, wherein this is preferably a glare-free dipped beam, II a second dipped beam distribution LVa2, which has an increased range in a right half of the light distribution compared to the first dipped beam distribution to allow an increased range at a right-hand lane edge for improved pedestrian detection, III a third dipped beam distribution LVa3, which is wider than the first dipped beam distribution and has a horizontal cut-off line, IV a fourth dipped beam distribution LVa4, which has an increased range compared to the first beam distribution by virtue of the fact that the dipped beam distribution is moved vertically upwards by an angle of at least 1° compared to the first light distribution.

It can further be provided that the second group 3b of full beam data sets 3a1, 3b2, 3b3 comprises data sets to produce the following different full beam distributions LVb1, LVb2, LVb3, LVb4:

I a first full beam distribution LVb1, which can be used as a standard full beam distribution, II a second full beam distribution LVb2, which has a reduced light intensity compared to the first full beam distribution LVb2 but operates such that it continues to meet at least the minimum legal requirements, III a third full beam distribution LVb3, which increases the light intensity or range at high vehicle speeds compared to the first full beam distribution, for example by raising the beam of light produced by the motor vehicle headlight.

In practice, all light distributions are, of course, designed by the specialist such that they can meet the applicable legal requirements.

With regard to FIG. 3, it should be mentioned that the number of data sets comprises a third group 3c of data sets, which concern special light distributions, which neither correspond to dipped beam distribution nor full beam distribution.

It can further be provided that the maximum temporal rate of change Var_max of the target light intensities IsegmZ is varied within a predetermined upper and lower limit as a function of the detected control data 1a, wherein the actual rate of change Var is selected in any case such that a change of the target light intensity of 0% up to 100% takes place within a time period of between 0.1 seconds and 5 seconds. In particular, it can be provided that the maximum temporal rate of change Var_max is increased compared to normal operation if a critical traffic situation is detected. The permissible maximum rate of change Var_max can, for example, also be changeable by using the control data. In a traffic-critical situation, it may be expedient for the permissible maximum rate of change to be selected as very high. This may be the case, for example, in the case of dazzling oncoming traffic, recognising/indicating wildlife at the roadside, recognising pedestrians etc.

It can further be provided that the motor vehicle headlight 2 is designed to check the plausibility of the control data 1a and to perform this check continuously, wherein if corrupted control data 1a is detected, a reversion to safe operation occurs in which preferably the first dipped beam distribution LVa1 is emitted.

In particular, it can be provided that the control data 1*a* contains information on other road users detected in the vicinity of the vehicle 1, and in the event that the active data sets 3*a*1, 3*a*2, 3*a*3, 3*a*4, 3*b*1, 3*b*2, 3*b*3, 3*b*4 contain full beam data sets 3*a*1, 3*a*2, 3*a*3, 3*a*4, these full beam distributions are manipulated such that segments 2*a*, the activation of which would dazzle these road users, are controlled with lower intensity, or are preferably completely hidden.

In addition, it can be provided that, to produce effects, the target light intensities IsegmZ for each segment 2*a* can be temporarily manipulated after step d3 by replacing the target light intensities IsegmZ calculated according to step d3 with effect light intensities. This temporary manipulation is limited to the duration of the effect/animation and is typically less than 5 seconds, e.g. welcome light.

Figure 4:
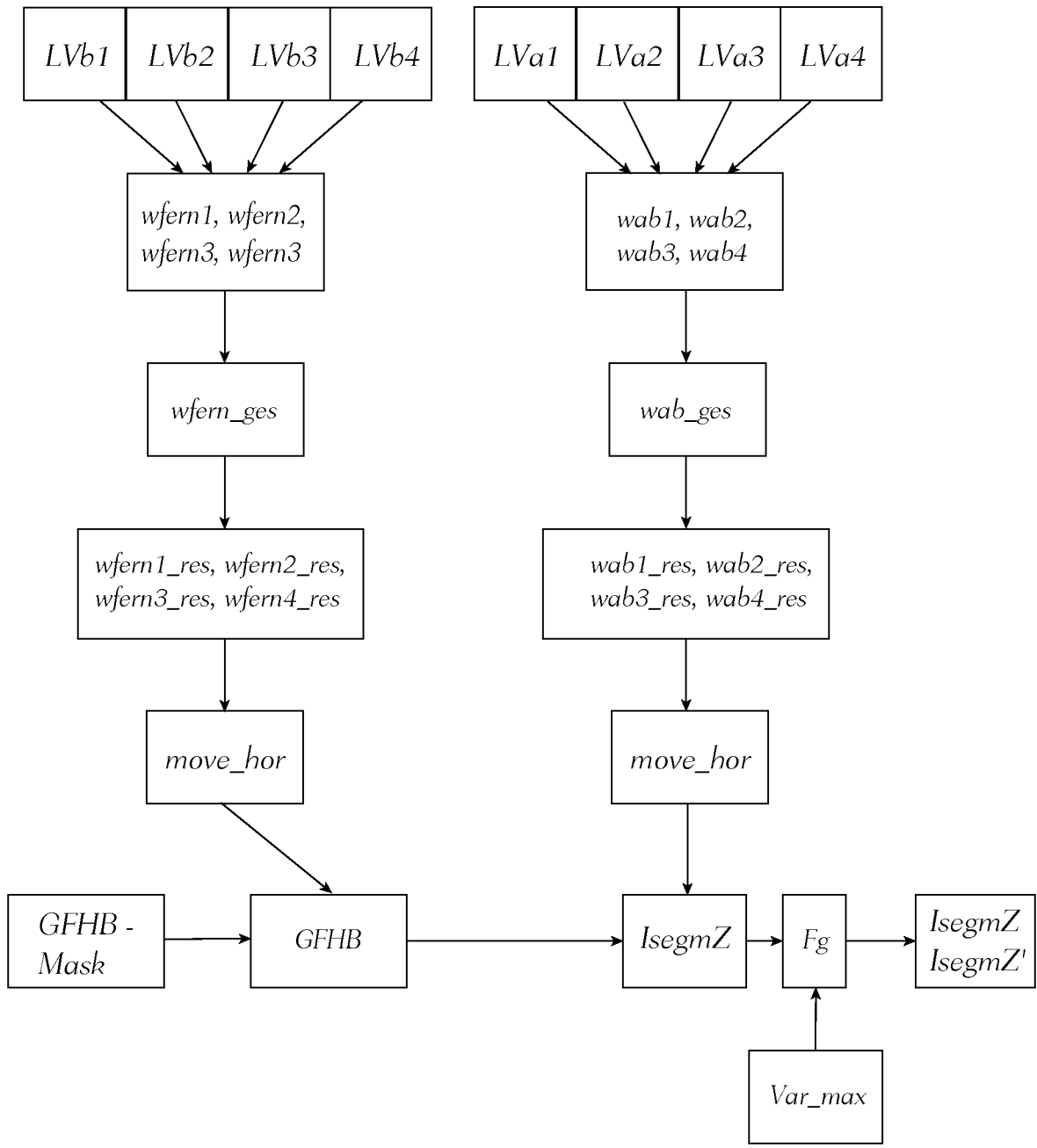
FIG. 4 shows an exemplary flow chart on the method according to the invention.

In addition, it can be provided that the target light intensities are manipulated according to step d3) as a function of the steering angle of the vehicle 1 by moving the target light distribution calculated according to step d3) in the horizontal direction as a function of the steering angle of the vehicle 1, wherein this function is called move_hor in FIG. 4. This can produce a cornering light by the light distribution being moved left, for example, when steering to the left. This means the target light intensities move in a horizontal direction between adjacent segments. This process can also be called "bending".

In a further aspect, the invention relates to an adaptive motor vehicle headlight 2, which is designed for use in a method according to one of the method claims, wherein the adaptive motor vehicle headlight 2 is designed to emit different segmented light distributions having a resolution of at least 2×12 and has light sources 2*aa* arranged in segments 2*a* for this purpose, wherein each segment 2*aa* comprises at least one LED light source.

The invention further relates to a motor vehicle 1 comprising an adaptive motor vehicle headlight 2 according to the invention as well as a first data storage device 3, which is assigned to the adaptive motor vehicle headlight 2, wherein a number of data sets 3*a*1, 3*a*2, 3*a*3, 3*a*4, 3*b*1, 3*b*2, 3*b*3, 3*b*4 are stored on the first data storage device 3, wherein each data set specifies a light intensity value IsegmLV for each segment 2*a* for implementing light distribution LVa1, LVa2, LVa3, LVa4, LVb1, LVb2, Lvb3 to be emitted by the adaptive motor vehicle headlight 2, wherein the number of data sets comprises at least two groups 3*a*, 3*b* of data sets, namely a first group 3*a* of dipped beam data sets 3*a*1, 3*a*2, 3*a*3, 3*a*4 and a second group 3*b* of full beam data sets 3*b*1, 3*b*2, 3*b*3, 3*b*4, wherein each group 3*a*, 3*b* comprises at least one data set 3*a*1, 3*a*2, 3*a*3, 3*a*4, 3*b*1, 3*b*2, 3*b*3, 3*b*4, wherein each dipped beam data set 3*a*1, 3*a*2, 3*a*3, 3*a*4 is configured to produce dipped beam distribution and each full beam data set 3*b*1, 3*b*2, 3*b*3 is configured to produce full beam distribution, wherein the configurations of the respective light distributions are different for different data sets 3*a*1, 3*a*2, 3*a*3, 3*a*4, 3*b*1, 3*b*2, 3*b*3, 3*b*4, wherein the motor vehicle 1 is designed for environment detection as well as for transmitting control data 1*a* to the motor vehicle headlight.

Figure 5A:
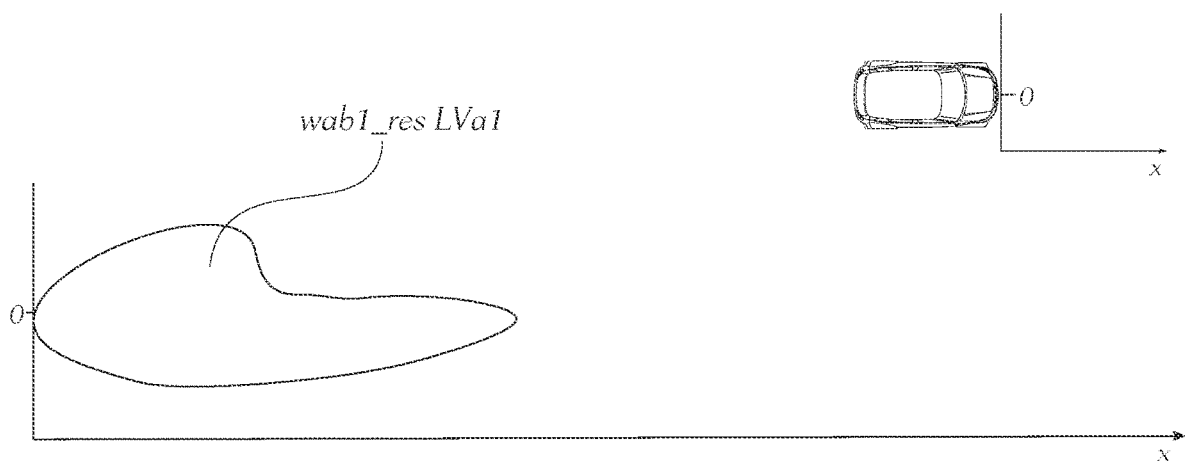
FIGS. 5a to 5c show exemplary light distributions, which can be emitted with the method according to the invention.
Figure 5B:
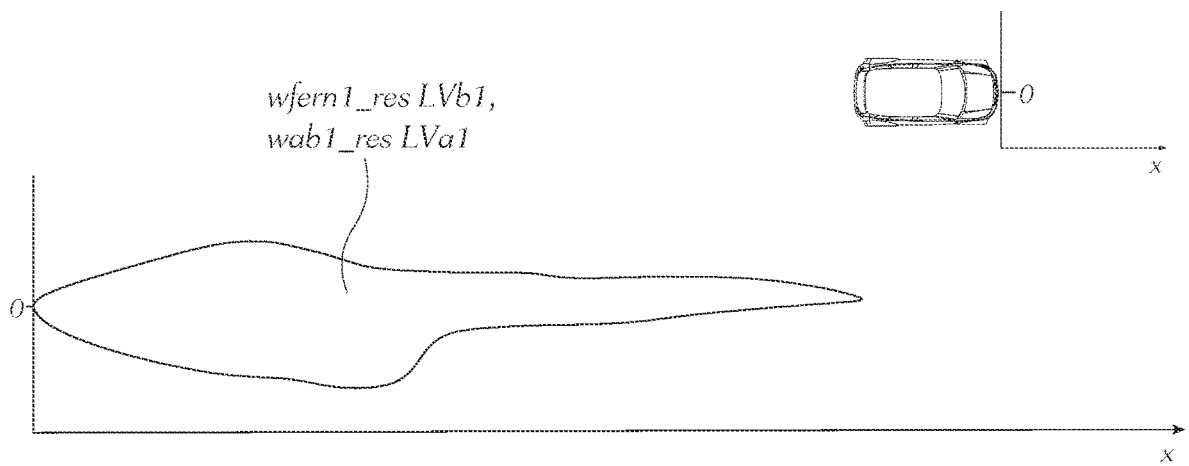
Figure 5C:
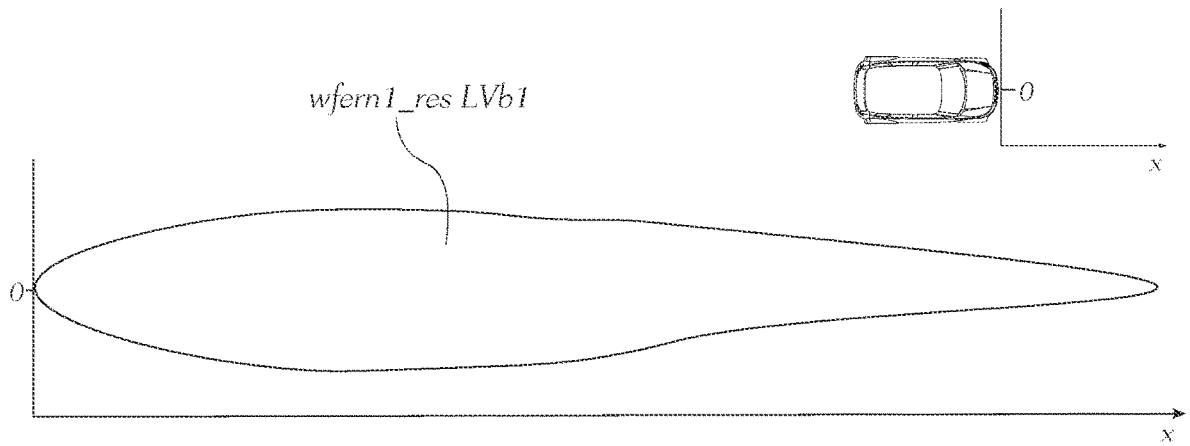

FIGS. 5*a* to 5*c* show exemplary schematic illustrations of light distributions, which can be emitted with the method according to the invention. They each show a plan view of a light distribution projected onto a flat horizontal surface, typically a road surface. FIG. 5*a*, for example, shows the light distribution LVa1 in detail without other light distributions being superimposed. The weighting wab1_res could therefore be 100% in this example. FIG. 5*c* shows a light distribution Lvb1 with a weighting of, for example, 50%, wfern1_res at 100%. FIG. 5*b* shows the superimposition of the light distributions LVa1 and LVb1, wherein the weightings wfern1_res and wab1_res could be, for example, respectively 50%.

The invention is not limited to the embodiments shown, but is defined by the entire scope of protection of the claims. Individual aspects of the invention or embodiments may also be adopted and combined with each other. Any reference numbers in the claims are exemplary and merely serve to make the claims easier to read, without limiting them.

The invention claimed is:

1. A method for controlling an adaptive motor vehicle headlight (2), wherein a first data storage device (3) is assigned to the adaptive motor vehicle headlight (2), wherein the adaptive motor vehicle headlight (2) is designed to emit different segmented light distributions having a resolution of at least 2×12 and has light sources (2*aa*) arranged in segments (2*a*) for this purpose, wherein each segment (2*aa*) comprises at least one LED light source, the method comprising:
 a) providing the adaptive motor vehicle headlight (2) and the first data storage device (3) as well as storing a number of data sets (3*a*1, 3*a*2, 3*a*3, 3*a*4, 3*b*1, 3*b*2, 3*b*3, 3*b*4) on the first data storage device (3), wherein each data set specifies a light intensity value (IsegmLV) for each segment (2*a*) for implementing light distribution (LVa1, LVa2, LVa3, LVa4, LVb1, LVb2, Lvb3) to be emitted by the adaptive motor vehicle headlight (2), wherein the number of data sets comprises at least two groups (3*a*, 3*b*) of data sets, namely a first group (3*a*) of dipped beam data sets (3*a*1, 3*a*2, 3*a*3, 3*a*4) and a second group (3*b*) of full beam data sets (3*b*1, 3*b*2, 3*b*3, 3*b*4), wherein each group (3*a*, 3*b*) comprises at least one data set (3*a*1, 3*a*2, 3*a*3, 3*a*, 3*b*1, 3*b*2, 3*b*3, 3*b*4), wherein each dipped beam data set (3*a*1, 3*a*2, 3*a*3, 3*a*4) is configured to produce dipped beam distribution and each full beam data set (3*b*1, 3*b*2, 3*b*3) is configured to produce full beam distribution, wherein the configurations of the respective light distributions are different for different data sets (3*a*1, 3*a*2, 3*a*3, 3*a*4, 3*b*1, 3*b*2, 3*b*3, 3*b*+);
 b) connecting the adaptive motor vehicle headlight (2) to a motor vehicle (1), wherein the motor vehicle (1) is designed to output control data (1*a*) for controlling the adaptive motor vehicle headlight (2);
 c) transmission of the control data (1*a*) by the motor vehicle (1) to the adaptive motor vehicle headlight (2), wherein the adaptive motor vehicle headlight (2) has an internal computing unit (2*c*), which receives the control data (1*a*) and selects and retrieves data sets (3*a*1, 3*a*2, 3*a*3, 3*a*4, 3*b*1, 3*b*2, 3*b*3) stored in the first data storage device (3) as a function of the control data (1*a*), hereinafter also referred to as active data sets; and
 d) control of the light sources (2*aa*) arranged in the segments (2*a*) by the computing unit (2*c*) in accordance with the active data sets (3*a*1, 3*a*2, 3*a*3, 3*a*4, 3*b*1, 3*b*2, 3*b*3) according to step (c) using a configurable smoothing function (Fg), wherein the adaptive motor vehicle headlight (2) has an internal data storage device (2*d*), on which a light distribution transition control algorithm (LV-AL) is stored, wherein the light distribution transition control algorithm (LV-AL) can be specified by an interface (4), by means of which the internal data storage device (2*d*) can be externally accessed, and the configurable smoothing function (Fg) is set by the light distribution transition control algorithm (LV-AL), wherein the configurable smoothing function (Fg) is used in any case in compliance with the following rules:
- d1) determining the number of active data sets (3a1, 3a2, 3a3, 3a4, 3b1, 3b2, 3b3), wherein the control data (1a) is used to give each active data set (3a1, 3a2, 3a3, 3a4, 3b1, 3b2, 3b3) an individual percentage weighting (wab1, wab2, wab3, wfern1, wfern2, wfern3),
- d2) determining the target light intensities (IsegmZ) to be output of each segment (2a) by superimposing the light intensity values (IsegmLV) that can be derived from the active data sets (3a1, 3a2, 3a3, 3b1, 3b2, 3b3) taking the respective weighting into account,
- d3) output of the target light intensities (IsegmZ) for each segment (2a) taking into account a permissible maximum temporal rate of change of the light intensity that can be predetermined, which is emitted by the respective segment (2a), wherein if a permissible maximum temporal rate of change (Var) that can be predetermined by the configurable smoothing function (Fg) is exceeded, the target light intensities (IsegmZ, IsegmZ') are temporarily manipulated such that the permissible maximum temporal rate of change (Var_max) is not exceeded.

2. The method according to claim 1, wherein the total of the individual percentage weightings (wab1, wab2, wab3, wfern1, wfern2, wfern3) in each group (3a, 3b) does not exceed the value 100%, and wherein each group (3a, 3b) is in turn given a group weight value (wab_ges, wfern_ges), and the total of the group weight values does not exceed the value 100%, wherein the target light intensities of each segment (2a) are determined in accordance with step d2) by virtue of the individual percentage weightings (wab1, wab2, wab3, wab4, wfern1, wfern2) being multiplied by the respective group weight value (wab_ges, wfern_ges) of the associated group and the resulting weight values (wab1_res, wab2_res) are calculated, wherein the light intensity values (IsegmLV) that can be derived from the active data sets (3a1, 3a2, 3a3, 3a4, 3b1, 3b2, 3b3, 3b4) are multiplied by the respective resulting weight value (wab1_res, wab2_res) and the resulting light intensity values for each segment (2a) of each active data set (3a1, 3a2, 3a3, 3a4, 3b1, 3b2, 3b3, 3b4) are added up and this total is determined as the target light intensity for each segment (2a).

3. The method according to claim 2, wherein all weight values are selected such that the total of the resulting weight values (wab1_res, wab2_res) reaches the value 100%.

4. The method according to claim 1, wherein the first group (3a) of dipped beam data sets (3a1, 3a2, 3a3, 3a4) comprises data sets to produce the following different dipped beam distributions (LVa1, LVa2, LVa3, LVa4):
- I) a first dipped beam distribution (LVa1), which can be used as a standard dipped beam distribution, wherein this is preferably a glare-free dipped beam,
- II) a second dipped beam distribution (LVa2), which has an increased range in a right half of the light distribution compared to the first dipped beam distribution to allow an increased range at a right-hand lane edge for improved pedestrian detection,
- III) a third dipped beam distribution (LVa3), which is wider than the first dipped beam distribution and has a horizontal cut-off line, and
- IV) a fourth dipped beam distribution (LVa4), which has an increased range compared to the first beam distribution by virtue of the fact that the dipped beam distribution is moved vertically upwards by an angle of at least 1° compared to the first light distribution.

5. The method according to claim 1, wherein the second group (3b) of full beam data sets (3b1, 3b2, 3b3) comprises data sets to produce the following different full beam distributions (LVb1, LVb2, LVb3, LVb4):
- I) a first full beam distribution (LVb1), which can be used as a standard full beam distribution,
- II) a second full beam distribution (LVb2), which has a reduced light intensity compared to the first full beam distribution (LVb2) but operates such that it continues to meet at least the minimum legal requirements, and
- III) a third full beam distribution (LVb3), which increases the light intensity or range at high vehicle speeds compared to the first full beam distribution, for example by raising the beam of light produced by the motor vehicle headlight.

6. The method according to claim 1, wherein the number of data sets comprises a third group (3c) of data sets, which concern special light distributions, which neither correspond to dipped beam distribution nor full beam distribution.

7. The method according to claim 1, wherein the maximum temporal rate of change (Var_max) of the target light intensities (IsegmZ) is varied within a predetermined upper and lower limit as a function of the detected control data (1a), wherein the actual rate of change (Var) is selected in any case such that a change of the target light intensity of 0% up to 100% takes place within a time period of between 0.1 seconds and 5 seconds.

8. The method according to claim 7, wherein the maximum temporal rate of change (Var_max) is increased compared to normal operation if a critical traffic situation is detected.

9. The method according to claim 1, wherein the motor vehicle headlight (2) is designed to check the plausibility of the control data (1a) and to perform this check continuously, wherein if corrupted control data (1a) is detected, a reversion to safe operation occurs in which preferably the first dipped beam distribution (LVa1) is emitted.

10. The method according to claim 1, wherein the control data (1a) contains information on other road users detected in the vicinity of the vehicle (1), and in the event that the active data sets (3a1, 3a2, 3a3, 3a4, 3b1, 3b2, 3b3, 3b4) contain full beam data sets (3a1, 3a2, 3a3, 3a4), these full beam distributions are manipulated such that segments (2a), the activation of which would dazzle these road users, are controlled with lower intensity, or are preferably completely hidden.

11. The method according to claim 1, wherein, to produce effects, the target light intensities (IsegmZ) for each segment (2a) can be temporarily manipulated after step d3) by replacing the target light intensities (IsegmZ) calculated according to step d3) with effect light intensities.

12. The method according to claim 1, wherein the target light intensities are manipulated according to step d3) as a function of the steering angle of the vehicle (1) by moving the target light distribution calculated according to step d3) in the horizontal direction as a function of the steering angle of the vehicle (1) (move_hor).

13. An adaptive motor vehicle headlight (2), which is designed for use in a method according to claim 1, wherein the adaptive motor vehicle headlight (2) is designed to emit different segmented light distributions having a resolution of at least 2×12 and has light sources (2aa) arranged in segments (2a) for this purpose, wherein each segment (2aa) comprises at least one LED light source.

14. A motor vehicle (1) comprising:
an adaptive motor vehicle headlight (2) according to claim 13; and
a first data storage device (3), which is assigned to the adaptive motor vehicle headlight (2), wherein a number of data sets (3a1, 3a2, 3a3, 3a4, 3b1, 3b2, 3b3, 3b4) is stored on the first data storage device (3), wherein each data set specifies a light intensity value (IsegmLV) for each segment (2a) for implementing light distribution (LVa1, LVa2, LVa3, LVa4, LVb1, LVb2, Lvb3) to be emitted by the adaptive motor vehicle headlight (2), wherein the number of data sets comprises at least two groups (3a, 3b) of data sets, namely a first group (3a) of dipped beam data sets (3a1, 3a2, 3a3, 3a4) and a second group (3b) of full beam data sets (3b1, 3b2, 3b3, 3b4), wherein each group (3a, 3b) comprises at least one data set (3a1, 3a2, 3a3, 3a4, 3b1, 3b2, 3b3, 3b), wherein each dipped beam data set (3a1, 3a2, 3a3, 3a4) is configured to produce dipped beam distribution and each full beam data set (3b1, 3b2, 3b3) is configured to produce full beam distribution, wherein the configurations of the respective light distributions are different for different data sets (3a1, 3a2, 3a3, 3a4, 3b1, 3b2, 3b3, 3b4), wherein the motor vehicle (1) is designed for environment detection as well as for transmitting control data (1a) to the motor vehicle headlight.

\* \* \* \* \*